(12) United States Patent
Kaliaperumal (10) Patent No.: US 11,470,543 B2
(45) Date of Patent: Oct. 11, 2022

(54) ACCESS RESTRICTION FOR A PRIVATE OR NEUTRAL-HOST NETWORK

(71) Applicant: ARRIS Enterprises LLC, Suwanee, GA (US)

(72) Inventor: Rajesh Kaliaperumal, Cupertino, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 19 days.

(21) Appl. No.: 17/206,664

(22) Filed: Mar. 19, 2021

(65) Prior Publication Data

US 2021/0297936 A1    Sep. 23, 2021

Related U.S. Application Data

(60) Provisional application No. 62/992,532, filed on Mar. 20, 2020.

(51) Int. Cl.
| | |
|---|---|
| *H04W 48/16* | (2009.01) |
| *H04W 12/71* | (2021.01) |
| *H04W 12/06* | (2021.01) |
| *H04W 12/72* | (2021.01) |
| *H04W 84/04* | (2009.01) |
| *H04L 101/654* | (2022.01) |

(52) U.S. Cl.
CPC .......... *H04W 48/16* (2013.01); *H04W 12/06* (2013.01); *H04W 12/71* (2021.01); *H04W 12/72* (2021.01); *H04L 2101/654* (2022.05); *H04W 84/042* (2013.01)

(58) Field of Classification Search
CPC ..... H04W 48/16; H04W 12/06; H04W 12/71; H04W 12/72; H04W 84/042; H04W 48/02; H04W 12/08; H04L 2101/654
See application file for complete search history.

(56) References Cited

U.S. PATENT DOCUMENTS

| | | | |
|---|---|---|---|
| 11,304,109 B1* | 4/2022 | Potharaju | H04W 36/0058 |
| 2017/0265073 A1 | 9/2017 | Stephenson et al. | |
| 2019/0007990 A1 | 1/2019 | Kaliaperumal et al. | |
| 2019/0053300 A1 | 2/2019 | Kaliaperumal | |
| 2019/0261445 A1 | 8/2019 | Bhatnagar et al. | |

OTHER PUBLICATIONS

International Search Report and Written Opinion, International Application No. PCT/US2021/023078, dated Mar. 19, 2021.

* cited by examiner

*Primary Examiner* — Diane D Mizrahi
(74) *Attorney, Agent, or Firm* — Steven Stupp; Stewart Wiener (57) ABSTRACT

During operation, a computer receives an attachment request from a radio node, where the attachment request is associated with an electronic device, and includes an identifier of the radio node, an identifier of the electronic device and an identifier of a service provider. Then, the computer determines a first entity identifier of an entity based at least in part on the identifier of the radio node and a second entity identifier of the entity based at least in part on the identifier of the electronic device. When the first entity identifier matches the second entity identifier, the computer performs authentication of the electronic device. Alternatively, if the entity identifiers are different, but the identifier of the service provider matches a stored identifier, the computer performs the authentication of the electronic device. Otherwise, the computer does not allow the electronic device to attach to a private or neutral-host network.

20 Claims, 5 Drawing Sheets

ACCESS RESTRICTION FOR A PRIVATE OR NEUTRAL-HOST NETWORK

CROSS REFERENCE TO RELATED APPLICATIONS

This application claims priority under 35 U.S.C. 119(e) to: U.S. Provisional Application Ser. No. 62/992,532, "Access Restriction for a Private or Neutral-Host Network," filed on Mar. 20, 2020, by Rajesh Kaliaperumal, the contents of which are herein incorporated by reference.

FIELD

The described embodiments relate to techniques for communicating information among electronic devices. Notably, the described embodiments relate to techniques for restricting access to a private or neutral-host network.

BACKGROUND

While many electronic devices communicate with each other via large networks owned by a network operator, small-scale networks associated with entities (such as a company or an organization) are increasingly common. A small-scale network complements the service offered by the network operator and can offer improved communication performance, such as in a particular venue or environment.

However, it can be difficult to flexibly restrict or control access to a small-scale network. Notably, the access-control techniques used in larger cellular-telephone networks (which are sometimes referred to as 'macrocells'), which are operated or provided by mobile network operators, may not be suitable for a small-scale network. For example, it may be difficult to scale down the access-control techniques from a lager cellular-telephone network to the smaller number of users in a small-scale network.

SUMMARY

A computer that restricts access to a private or neutral-host network associated with an entity is described. This computer includes: an interface circuit that communicates with a radio node; a processor coupled to the interface circuit; and memory, coupled to the processor, storing program instructions. When executed by the processor, the program instructions cause the computer to perform operations. Notably, the computer receives an attachment request from the radio node, where the attachment request is associated with an electronic device (e.g., the attachment request may have been sourced from the electronic device, such as the attachment request may include a source address of the electronic device), and includes an identifier of the radio node, an identifier of the electronic device and an identifier of a service provider. Then, the computer determines a first entity identifier of the entity based at least in part on the identifier of the radio node, and a second entity identifier of the entity based at least in part on the identifier of the electronic device. When the first entity identifier matches the second entity identifier, the computer performs authentication of the electronic device. Alternatively, when the first entity identifier is different from the second entity identifier, and the identifier of the service provider matches a predefined identifier of the service provider that is stored in the memory, the computer performs the authentication of the electronic device. Otherwise, the computer does not allow the electronic device to attach to the private or neutral-host network.

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Moreover, the identifier of the radio node may include an E-UTRAN cell global identifier (ECGI). Furthermore, the identifier of the electronic device may include an international mobile subscriber identity (IMSI) or a subscription permanent identifier (SUPI). Additionally, the identifier of the service provider may include a public land mobile network (PLMN) identifier. Note that the identifier of the service provider (such as the PLMN identifier) may be included in the identifier of the electronic device. Thus, in some embodiments, the service provide may operate or provide a cellular-telephone network.

In some embodiments, the identifier of the radio node is a unique identifier, and the identifier of the electronic device is a second unique identifier.

Moreover, determining the first entity identifier may involve performing a lookup in a predefined list of identifiers of radio nodes in the private or neutral-host network and the first entity identifier. Furthermore, determining the second entity identifier may involve performing a lookup in a predefined list of identifiers of electronic devices and the second entity identifier.

Additionally, the computer may include a computer system.

Note that the computer may restrict access to the private or neutral-host network without using a closed subscriber group (CSG).

Another embodiment provides a computer-readable storage medium with program instructions for use with the computer. When executed by the computer, the program instructions cause the computer to perform at least some of the aforementioned operations in one or more of the preceding embodiments.

Another embodiment provides a method, which may be performed by the computer. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer that restricts access to a private or neutral-host network associated with an entity is described. During operation, the computer receives an attachment request from a radio node, where the attachment request is associated with an electronic device, and includes an identifier of the radio node, an identifier of the electronic device and an identifier of a service provider. Then, the computer determines a first entity identifier of the entity based at least in part on the identifier of the radio node, and a second entity identifier of the entity based at least in part on the identifier of the electronic device. When the first entity identifier matches the second entity identifier, the computer performs authentication of the electronic device. Alternatively, when the first entity identifier is different from the second entity identifier, and the identifier of the service provider matches a predefined identifier of the service provider that is stored in memory associated with the computer, the computer performs the authentication of the electronic device. Otherwise, the computer does not allow the electronic device to attach to the private or neutral-host network.

By restricting access to a private or neutral-host network, these communication techniques may allow the entity to selectively allow users (via their associated electronic devices) to attach to the private or neutral-host network without using a CSG. Notably, the communication techniques may provide controlled access, which is needed for security and so the entity can successfully operate the private or neutral-host network, without using access-control techniques from larger cellular-telephone networks that do not scale down well for use with the private or neutral-host network. Consequently, the communication techniques may improve offer the advantages of controlled or restricted access, as well as reduced cost and complexity.

We now describe some embodiments of the communication techniques. A cellular-telephone network may include base stations (and associated cell towers) that implement so-called macrocells. These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication techniques.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge with a small-scale network (such as a small cell) is how to flexibly restrict or control access. In a large-scale network, such as a cellular-telephone network or macrocell, access may be restricted using subscriber identity module (SIM) cards in cellular telephones and a CSG, which is sometimes referred to as a 'closed user group.' (More generally, access may be restricted using an access-restriction technique, such as those specified by the 3rd Generation Partnership Project of Sophia Antipolis, Valbonne, France.)

Notably, an electronic device (such as a cellular telephone) of a user or subscriber to a cellular-telephone network operated or provided by a mobile network operator may include a SIM card with a unique identifier of the cellular telephone, such as an IMSI or a SUFI. (In the discussion that follows, an IMSI is used as an illustrative example.) When the electronic device attempts to attach to the cellular-telephone network, the cellular telephone provides information included in the SIM card, such as the IMSI, which facilitates controlled network access. For example, access may be restricted to an IMSI of a registered subscriber to the cellular-telephone network, and the cellular-telephone network may be specified by a PLMN identifier that is included in the IMSI of the electronic device.

Some small cells are operated as private or closed networks. In these small cells, access may be restricted to a predefined group of users. For example, allowed users in the predefined group of users may be issued private-network-specific SIM cards, which are installed in the electronic devices of the predefined group of users. Then, when an electronic device of one of these users attempts to access or attach to the private network, the electronic device may provide an attach request with an IMSI that is included in a private-network-specific SIM card. A packet core in the private network may compare the IMSI to a stored list of allowed IMSIs in a predefined CSG. When there is a match, the electronic device may be allowed to attach to the private network.

However, there are often problems with this access-restriction technique. Notably, the use of SIM cards and a predefined CSG is typically inflexible. It is difficult to add or modify the electronic devices that are allowed to access a small cell. For example, in this approach, a new user may need to be issued a SIM card for their electronic device, and the predefined CSG may need to be updated. This is time-consuming and cumbersome.

In addition, private-network-specific SIM cards are often expensive. This is because there may be far fewer users of a private network than of a larger cellular-telephone network. For example, there may be 50-100 users of a private network, which may significantly increase the cost of the private-network-specific SIM cards.

These challenges are addressed in the communication techniques described below. In the discussion that follows, Long Term Evolution or LTE (from the 3rd Generation Partnership Project) is used as an illustration of a data communication protocol in a small cell that is used during communication between one or more radio nodes and a computer. (In the present discussion, a small cell is used as an illustration of a small-scale network.) Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Washington), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

Figure 1:
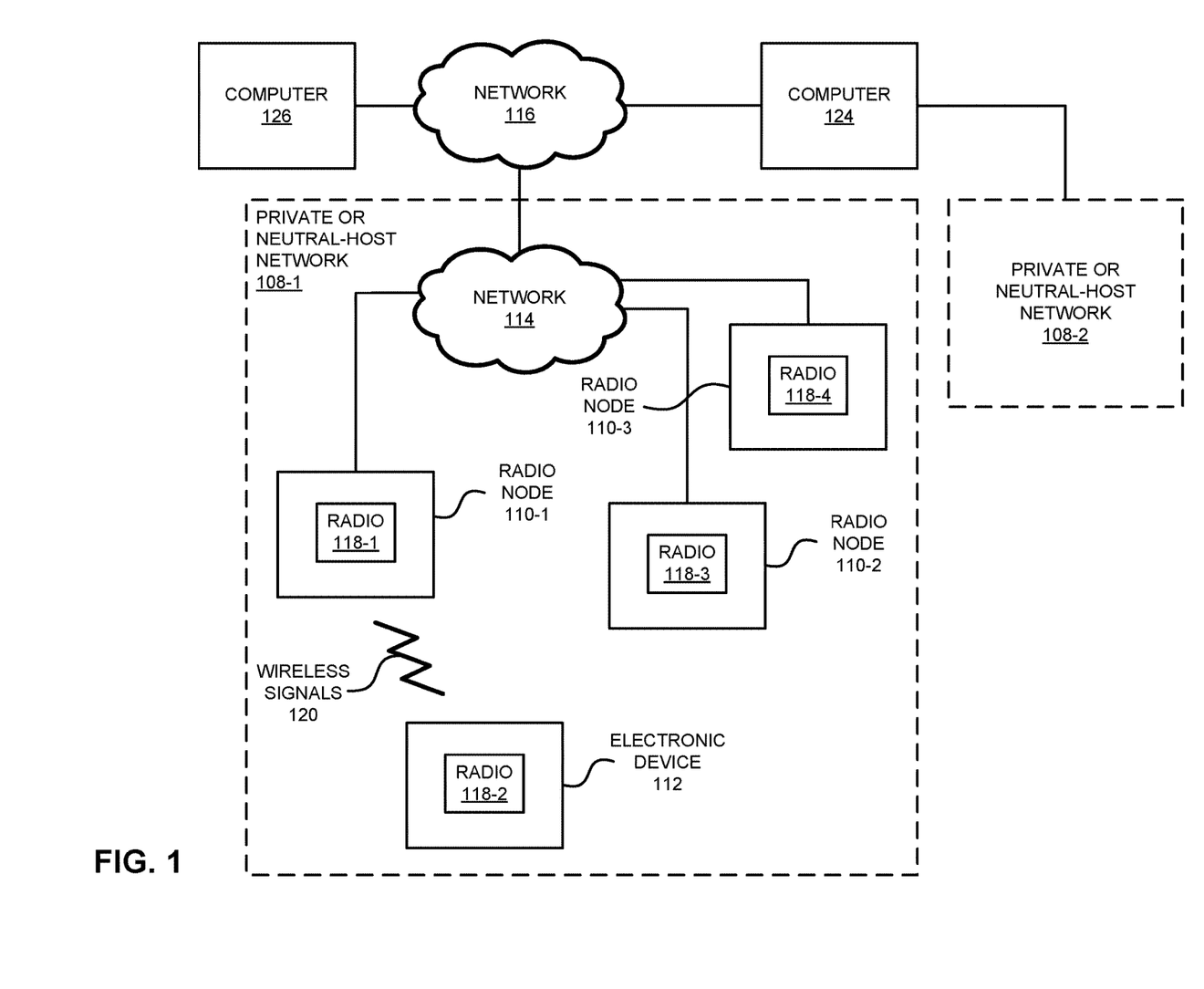
FIG. 1 is a block diagram illustrating an example of communication among a computer, radio nodes and electronic devices in a system in accordance with an embodiment of the present disclosure.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a portable electronic device). Again, while LTE is used as an example of a cellular protocol, the embodiments herein are not so limited. Moreover, radio nodes 110 may also communicate (via wireless or wired communication, such as Ethernet, in network 114) with each other and with computer 124 (or a computer system). Note that computer 124 may implemented in close proximity to radio nodes 110 (i.e., locally) and/or remotely (such as in a cloud-based computer system).

Note that radio nodes 110 may be associated with a private or neutral-host network 108-1 at a venue (such as building, a location, etc.). In some embodiments, radio nodes 110 associated with another private or neutral-host network 108-2 at a different venue may also communicate with computer 124. For example, computer 124 may implement a packet core. The instances of the private or neutral-host networks 108 at the different venues may be associated with a common entity, such as a company or an organization. Moreover, the instances of the private or neutral-host networks 108 may share the packet core implemented by computer 124. While this may offer cost and scaling advantages, it may also pose problems. For example, the entity may not want users of private or neutral-host network 108-1 to be able to access private or neutral-host network 108-2 (or vice versa).

Figure 2:
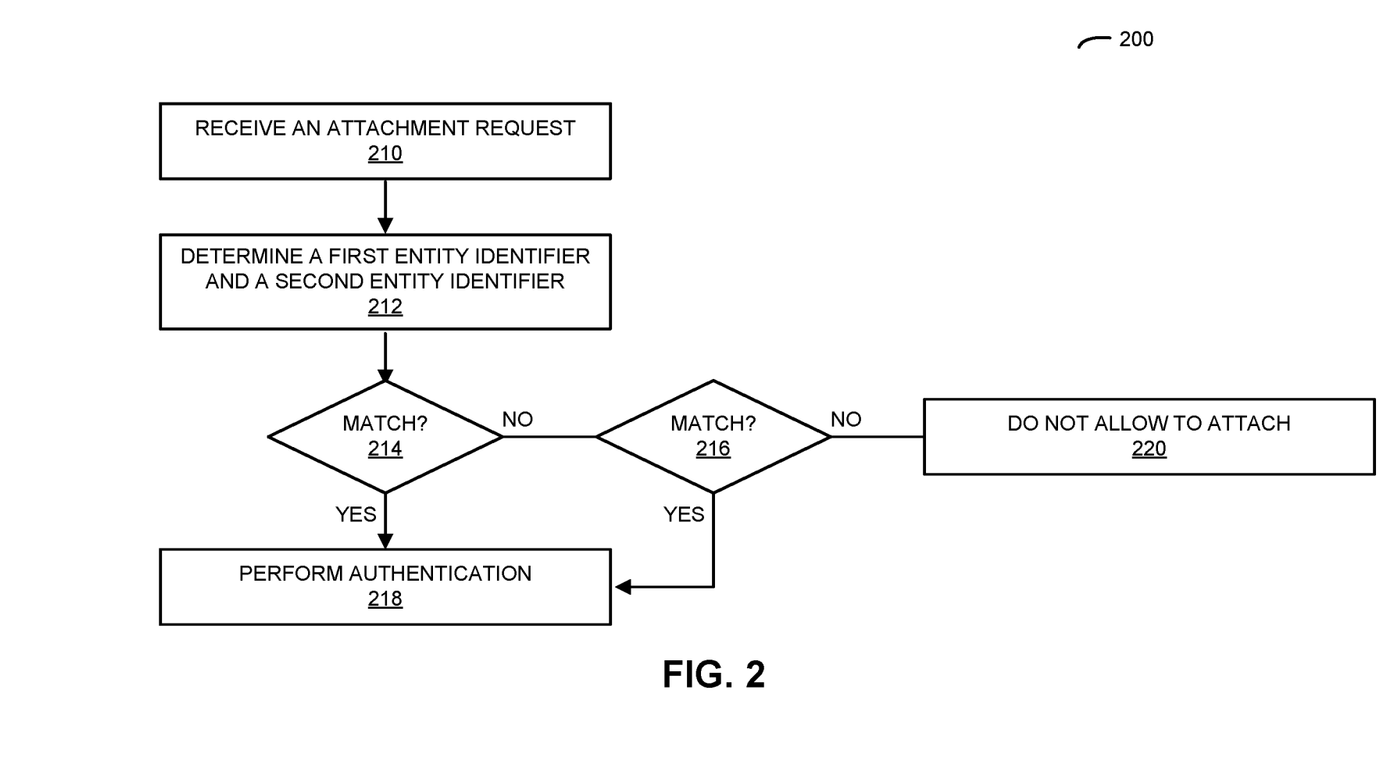
FIG. 2 is a flow diagram illustrating an example of a method for restricting access to a private or neutral-host network associated with an entity in FIG. 1 in accordance with an embodiment of the present disclosure.

As described further below with reference to FIGS. 2-4, in order to address the access-control problems, computer 124 may perform the communication techniques by communicating with one or more of radio nodes 110 and computer 126 via networks 114 and 116 (such as an intra-net and/or the Internet). Note that networks 114 and 116 may be the same or different networks.

Notably, when a private or neutral-host network (such as private or neutral-host network 108-1) is setup, after radio nodes 110 are deployed, identifiers of radio nodes 110 (such as ECGIs of radio nodes 110) may be provided to computer 126, which may provide cloud-based support for computer 124. Moreover, information specifying an entity identifier of the entity that provides or operates the associated private or neutral-host network may be provided to computer 126.

Then, computer 126 may provide or provision the identifiers of radio nodes 110 and the entity identifier to computer 124. As described further below with reference to FIG. 4, computer 124 may store the identifiers of radio nodes 110 and the entity identifier in a first list, such as a first look-up table. This first list may include a mapping from the identifiers of radio nodes 110 to one or more entity identifiers.

Next, SIM cards may be provided or distributed to users of electronic devices (such as electronic device 112). Note that a SIM card may include an identifier of an electronic device of a user, such as an IMSI or a SUPI of the electronic device. These users may install the SIM cards in their electronic devices, which, as described further below, may allow these users to access a private or neutral-host network as a private network.

Furthermore, computer 126 may provide or provision the identifiers of the electronic devices and the entity identifier to computer 124. As described further below with reference to FIG. 4, computer 124 may store the identifiers of the electronic devices and the entity identifier in a second list, such as a second look-up table. This second list may include a mapping from the identifiers of electronic devices to one or more entity identifiers.

Using radio node 110-1 as an example, subsequently radio node 110-1 may broadcast system information, such as ECGI of radio node 110-1. In response, electronic device 112 may attempt to associated with or attach to private or neutral-host network 108-1. Notably, electronic device 112 may provide an attach request to radio node 110-1. This attach request may include: an identifier of radio node 110-1 (such as the ECGI of radio node 110-1, and more generally a unique identifier of radio node 110-1), an identifier of electronic device 112 (such as an IMSI of electronic device 112, which may be stored in a SIM card in electronic device 112, and more generally a unique identifier of electronic device 112), and an identifier of a service provider. For example, the service provider may operate or provide a cellular-telephone network, and a user of electronic device 112 may be a subscriber to this service provider and/or the cellular-telephone network. Thus, the service provider may be a mobile network operator. In some embodiments, the identifier of the service provider may include a PLMN identifier of the cellular-telephone network, which may be included in the IMSI of electronic device 112. Alternatively or additionally, the service provider may provide or operate private or neutral-host network 108-1.

After receiving the attach request, radio node 110-1 may provide the attach request to computer 124 via networks 114 and 116. In response, computer 124 may determine a first entity identifier of the entity based at least in part on the identifier of radio node 110-1, and a second entity identifier of the entity based at least in part on the identifier of electronic device 112. Notably, computer 124 may access the first list (which as previously defined during deployment and provisioning of private or neutral-host network 108-1), and may look up a first instance of the entity identifier based at least in part on the identifier of radio node 110-1. Moreover, computer 124 may access the second list (which as previously defined during deployment and provisioning of private or neutral-host network 108-1), and may look up a second instance of the entity identifier based at least in part on the identifier of electronic device 112.

When the first instance of the entity identifier matches the second instance of the entity identifier, computer 124 may perform authentication of electronic device 110-1. If the authentication is successful, computer 124 may, via radio node 110-1, allow electronic device 112 to attach to private or neutral-host network 108-1.

Alternatively, when the first instance of the entity identifier is different from the second instance of the entity identifier, such as when electronic device 112 of the user is a visitor to private or neutral-host network 108-1 and, thus, may not be included in the second list, computer 124 may use the identifier of the service provider to determine if the user is allowed to attach to private or neutral-host network 108-1. Notably, computer 124 may determine whether the identifier of the service provider matches one of one or more predefined identifiers of service providers that are stored in the memory in or associated with computer 124. For example, predefined identifiers of service providers may be for one or more services providers that have a business relationship or agreement with the entity, which allows users or subscribers of the one or more service providers to attach to private or neutral-host network 108-1. When there is a match with the identifier of the service provider, computer 124 may perform authentication of electronic device 110-1. If the authentication is successful, computer 124 may, via radio node 110-1, allow electronic device 112 to attach to private or neutral-host network 108-1. Otherwise, when the identifier of the service provider does not match any of the predefined identifiers of service providers, computer 124 may not allow electronic device 112 to attach to the private or neutral-host network 108-1.

In these ways, the communication techniques may allow the entity to selectively restrict access to a private or neutral-host network. This approach may allow the private or neutral-host network to operate as a private network for some users and/or as a neutral-host network to other users. Moreover, the communication techniques may restrict access to the private or neutral-host network without using a CSG. Consequently, the communication techniques may provide flexibility, as well as reduced cost and complexity.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
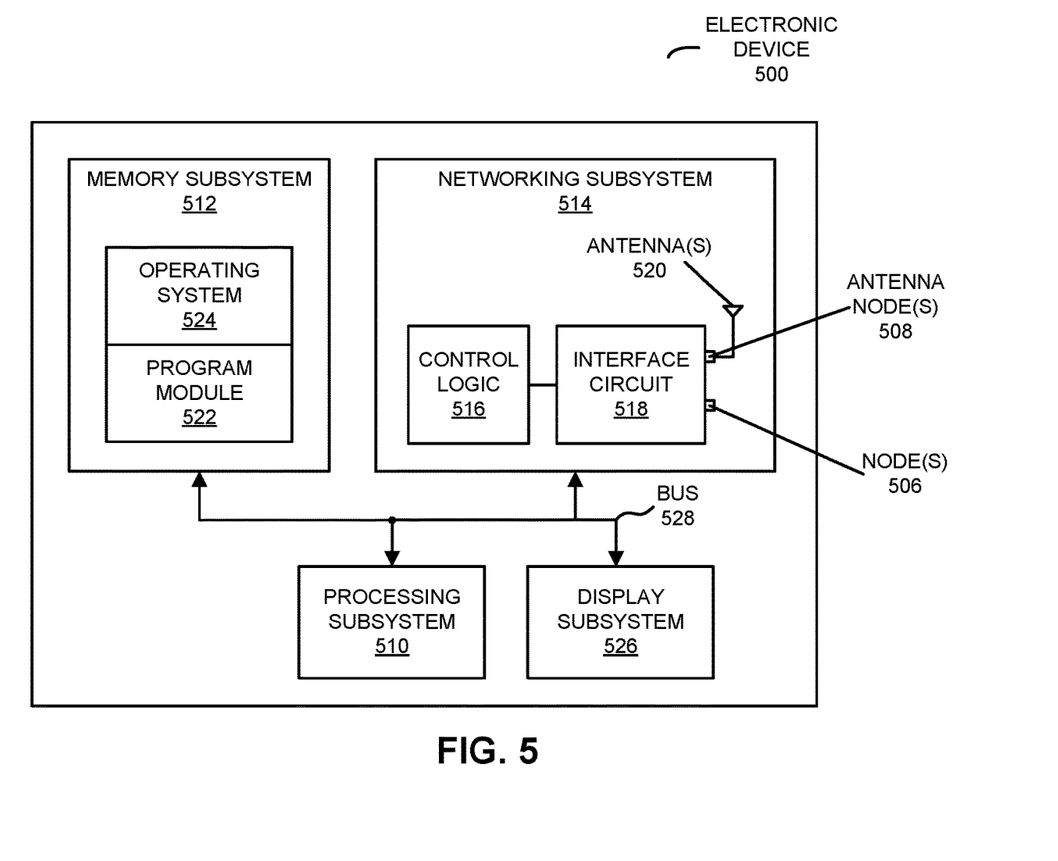
FIG. 5 is a block diagram illustrating an example of an electronic device in accordance with an embodiment of the present disclosure.

As described further below with reference to FIG. 5, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets. Moreover, while computer 124 is illustrated as being external to private or neutral-host networks 108, in some embodiments one or more of private or neutral-host networks 108 may include an instance of computer 124.

We now describe embodiments of the method. FIG. 2 presents a flow diagram illustrating an example of a method 200 for restricting access to a private or neutral-host network associated with an entity, which may be performed by a computer (such as computer 124 in FIG. 1). During operation, the computer may receive an attachment request (operation 210) from the radio node, where the attachment request is associated with an electronic device, and includes an identifier of the radio node, an identifier of the electronic device and an identifier of a service provider. Note that the identifier of the radio node may include an ECGI, the identifier of the electronic device may include an IMSI or a SUPI, and/or the identifier of the service provider may include a PLMN identifier.

Then, the computer may determine (operation 212) a first entity identifier of the entity based at least in part on the identifier of the radio node, and a second entity identifier of the entity based at least in part on the identifier of the electronic device. For example, determining the first entity identifier (operation 212) may involve performing a lookup in a predefined list of identifiers of radio nodes in the private or neutral-host network and the first entity identifier. Furthermore, determining the second entity identifier (operation 212) may involve performing a lookup in a predefined list of identifiers of electronic devices and the second entity identifier.

When the first entity identifier matches the second entity identifier (operation 214), the computer may perform authentication (operation 218) of the electronic device. Alternatively, when the first entity identifier is different from the second entity identifier (operation 214), and the identifier of the service provider matches a predefined identifier of the service provider (operation 216) that is stored in the memory, the computer may perform the authentication (operation 218) of the electronic device. Otherwise (operation 216), the computer may not allow the electronic device to attach (operation 220) to the private or neutral-host network.

Thus, the computer may restrict access to the private or neutral-host network without using a CSG.

In some embodiments of method 200, there may be additional or fewer operations. Furthermore, the order of the operations may be changed, and/or two or more operations may be combined into a single operation.

Figure 3:
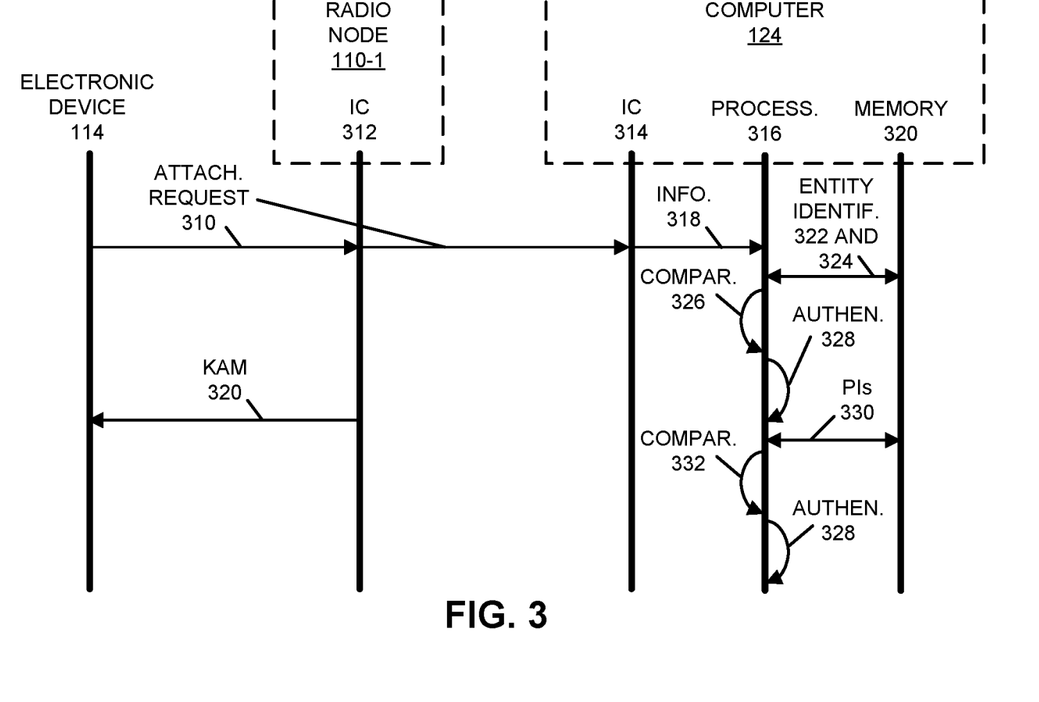
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among radio node 110-1, electronic device 112 and computer 124. In FIG. 3, electronic device 112 may provide an attachment request 310 to radio node 110-1 using wireless communication, where attachment request 310 may be an attempt by electronic device 112 to attach to a private or neutral-host network. This attachment request may include: an ECGI of radio node 110-1, an IMSI of electronic device 112, and an a PLMN identifier of a mobile network operator of a cellular-telephone network (which may be included in the IMSI of electronic device 112). After receiving attachment request 310, interface circuit (IC) 312 in radio node 110-1 may provide attachment request 310 to computer 124 using wired communication.

Interface circuit 314 in computer 124 may receive attachment request 310 from radio node 110-1. Then, interface circuit 314 may provide information 318 specifying the ECGI of radio node 110-1, the IMSI of electronic device 112 and/or the a PLMN identifier to processor 316 in computer 124. Processor 316 may determine an entity identifier 322 of an entity that operates a private or neutral-host network based at least in part on the ECGI of radio node 110-1 and an entity identifier 324 of the entity based at least in part on the IMSI of electronic device 112. For example, processor 316 may access, in memory 320 in computer 124, a predefined list of identifiers of one or more radio nodes in the private or neutral-host network and one or more entity identifiers, and a predefined list of identifiers of one or more electronic devices and one or more entity identifiers. Notably, processor 316 may perform a look-up of entity identifier 322 based at least in part on predefined list of identifiers and the ECGI of radio node 110-1, and may perform a look-up of entity identifier 324 based at least in part on predefined list of identifiers and the IMSI of electronic device 112.

When a comparison 326 of entity identifier 322 matches or is the same as entity identifier 324, processor 316 may perform authentication 328 of electronic device 112 and, if authentication 328 is successful, may instruct radio node 110-1 to attach or establish a connection with electronic device 112. Alternatively, when comparison 326 indicates that entity identifier 322 is different from entity identifier 324, processor 316 may access, in memory 318, one or more predefined identifiers (PIs) 330 of service providers. When a comparison 332 of an identifier of the service provider matches one of the one or more predefined identifiers 330 of the service provider, processor 316 may perform authentication 328 of electronic device 112 and, if authentication 328 is successful, may instruct radio node 110-1 to attach or establish the connection with electronic device 112. Otherwise, processor 316 may not allow electronic device 112 to attach to the private or neutral-host network.

While FIG. 3 illustrates communication between components using unidirectional or bidirectional communication with lines having single arrows or double arrows, in general the communication in a given operation in this figure may involve unidirectional or bidirectional communication.

Figure 4:
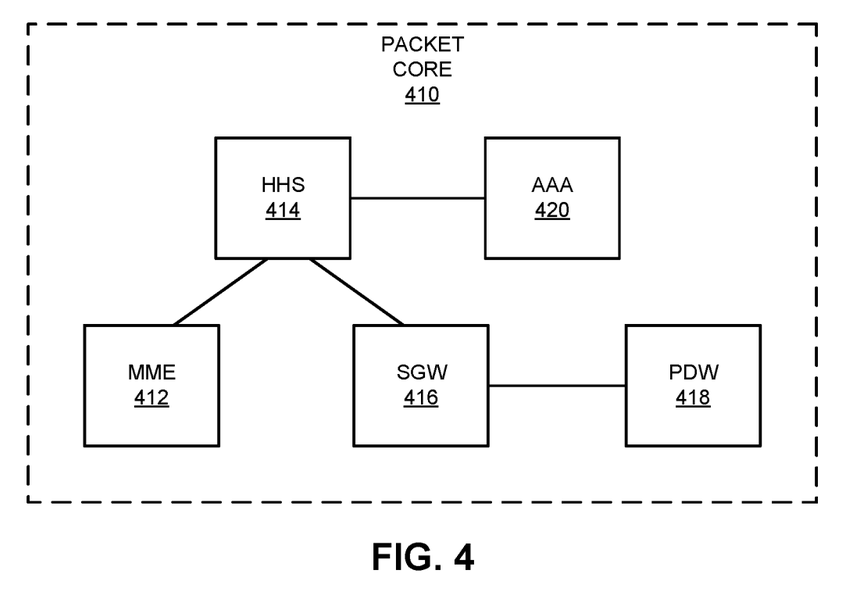
FIG. 4 is a drawing illustrating an example of a technique for restricting access to a private or neutral-host network associated with an entity using a packet core in FIG. 1 in accordance with an embodiment of the present disclosure.

FIG. 4 presents a drawing illustrating an example a technique for restricting access to a private or neutral-host network associated with an entity using a packet core 410, which may be implemented using one or more computers (such as computer 124 in FIG. 1 or a computer system that includes computer 124). Notably, packet core 410 may include: a mobility management entity (MME) 412, a home subscriber server (HSS) 414, a serving gateway (SGW) 416, a packet data network (PDN) gateway (PGW) 418, and an authentication, authorization, and accounting (AAA) server 420. When one or more private or neutral-host networks are deployed, computer 126 may provide, to packet core 410, a first predefined list of one or more identifiers of radio nodes and one or more entity identifiers of one or more entities that provide or operate the one or more private or neutral-host networks. Packet core 410 may store this first predefined list in memory associated with MME 412.

Moreover, when SIM cards are issued to users of electronic devices that are allowed to access at least one of the one or more private or neutral-host networks, computer 126 may provide, to packet core 410, a second predefined list of one or more identifiers of the electronic devices and one or more entity identifiers of one or more entities that provide or operate the one or more private or neutral-host networks. Packet core 410 may store this second predefined list in memory associated with HHS 414, such as in a subscriber management system.

Furthermore, computer 126 may provide, to packet core 410, a third predefined list with one or more identifiers of service providers that have a predefined relationship with one or more of the entities, such as a business relationship that grants access to one or more private or neutral-host networks for subscribers to one or more cellular-telephone networks provided or operated by the one or more service providers. Packet core 410 may store this third predefined list in memory.

Subsequently, when a given electronic device attempts to attach to a given private or neutral-host network, the communication techniques may use information in the stored first predefined list, second predefined list and/or third predefined list to determine whether (or not) to allow the given electronic device to attach to the given private or neutral-host network.

In some embodiments, an eNodeB has a peer-to-peer link with an evolved packet core, which provides AAA, mobility management, session management and gateway traffic management. This evolved packet core may support an entity or a tenant that provide or operate one or more private or neutral-host networks at different venues or locations. The one or more private or neutral-host networks may have a common or shared PLMN identifier.

However, the evolved packet core may not have a notion of an entity or a tenant, or a venue location. For example, the private or neutral-host network may use spectrum in a Citizens Broadband Radio Service, which is account based. In an account-based approach, user accounts with an entity that provides or operates the private or neutral-host network may have associated SIM cards.

In the communication techniques, the evolved packet core may correlate or associated the eNodeB location with a tenant location. Notably, the evolved packet core may store information specifying eNodeBs that are associated with an entity and information specifying distributed tenant SIM cards. When a user attempts to attach to the private or neutral-host network, the evolved packet core may determine if the user is in the correct network or the correct venue. If yes, the user may be authenticated and allowed to attach to the private or neutral-host network.

The communication techniques may provide different granularity. Thus, using the communication techniques, end users can be dynamically grouped. Moreover, visitors to the private or neutral-host network can be added according to a policy, such as by associating eNodeBs and users to a common identifier, e.g., the identifier of an entity that provides or operates the private or neutral-host network. Note that, in the case of a neutral-host network, it may not be possible to include all the necessary information in the SIM cards in the electronic devices of users.

We now describe embodiments of an electronic device, which may perform at least some of the operations in the communication techniques. FIG. 5 presents a block diagram illustrating an example of an electronic device 500 in accordance with some embodiments, such as one of radio nodes 110, electronic device 112, computer 124 or computer 126. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs or program modules may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a pad, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program module 522, operating system 524 (such as a driver for interface circuit 518) or in firmware in interface circuit 518. Thus, the communication techniques may be implemented at runtime of program module 522. Alternatively or additionally, at least some of the operations in the communication techniques may be implemented in a physical layer, such as hardware in interface circuit 518.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of these signals may be communicated in one or more different bands of frequencies, including: a microwave frequency band, a radar frequency band, 600 MHz, 2.4 GHz, 5 GHz, 6 GHz, 60 GHz, a band of frequencies used by CBRS (such as a frequency band near 3.5 GHz) and/or by LTE. In some embodiments, the communication between electronic devices uses multi-user transmission (such as orthogonal frequency division multiple access or OFDMA).

Furthermore, while the preceding discussion illustrated the communication techniques using the entity identifier, more generally the packet core may store a common identifier that specifies a relationship between the radio nodes in a private or neutral-host network and the electronic devices that are allowed to access or attached to the private or neutral-host network.

Additionally, in some embodiments, the communication techniques are used with a shared PLMN-based network. For example, a CBRS-based LTE networks may use the PLMN identifier of a mobile network operator or a shared PLMN identifier. Notably, the shared PLMN identifier may be used by an operator that is not a mobile network operator. However, a CSG option may be difficult with a shared PLMN identifier. Thus, in some embodiments of the communication techniques, a shared PLMN identifier is used instead of or in addition to a PLMN identifier.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
    an interface circuit configured to communicate with a radio node;
    a processor coupled to the interface circuit; and
    memory, coupled to the processor, configured to store program instructions, wherein, when executed by the processor, the program instructions cause the computer to perform operations, comprising:
        receive an attachment request associated with the radio node in a private or neutral-host network, wherein the attachment request is sourced from an electronic device, and comprises an identifier of the radio node, an identifier of the electronic device and an identifier of a service provider;
        determine a first entity identifier of an entity associated with the private or neutral-host network based at least in part on the identifier of the radio node, and a second entity identifier of the entity based at least in part on the identifier of the electronic device;
        when the first entity identifier matches the second entity identifier, perform authentication of the electronic device;
        when the first entity identifier is different from the second entity identifier, and when the identifier of the service provider matches a predefined identifier of the service provider that is stored in the memory, perform the authentication of the electronic device; and
        otherwise, does not allow the electronic device to attach to the private or neutral-host network.

2. The computer of claim 1, wherein the radio node comprises: an Evolved Node B (eNodeB), a Universal Mobile Telecommunications System (UMTS) NodeB and radio network controller (RNC), or a New Radio (NR) gNB or gNodeB.

3. The computer of claim 1, wherein the identifier of the radio node comprises an E-UTRAN cell global identifier (ECGI).

4. The computer of claim 1, wherein the identifier of the electronic device comprises an international mobile subscriber identity (IMSI) or a subscription permanent identifier (SUPI).

5. The computer of claim 1, wherein the identifier of the service provider comprises a public land mobile network (PLMN) identifier.

6. The computer of claim 1, wherein the identifier of the service provider is included in the identifier of the electronic device.

7. The computer of claim 1, wherein the identifier of the radio node comprises a unique identifier, and the identifier of the electronic device comprises a second unique identifier.

8. The computer of claim 1, wherein determining the first entity identifier comprises performing a lookup in a predefined list of identifiers of one or more radio nodes in the private or neutral-host network and the first entity identifier; and
    wherein determining the second entity identifier comprises performing a lookup in a predefined list of one or more identifiers of electronic devices and the second entity identifier.

9. The computer of claim 1, wherein the computer comprises a computer system.

10. The computer of claim 1, wherein the computer is configured to selectively restrict access to the private or neutral-host network without using a closed subscriber group (CSG).

11. A non-transitory computer-readable storage medium for use in conjunction with a computer, the computer-readable storage medium storing program instructions that, when executed by the computer, cause the computer to perform operations comprising:
    receiving an attachment request associated with a radio node in a private or neutral-host network, wherein the attachment request is sourced from an electronic device, and comprises an identifier of the radio node, an identifier of the electronic device and an identifier of a service provider;
    determining a first entity identifier of an entity associated with the private or neutral-host network based at least in part on the identifier of the radio node, and a second entity identifier of the entity based at least in part on the identifier of the electronic device;

when the first entity identifier matches the second entity identifier, performing authentication of the electronic device;

when the first entity identifier is different from the second entity identifier, and when the identifier of the service provider matches a predefined identifier of the service provider that is stored in memory, performing the authentication of the electronic device; and otherwise, not allowing the electronic device to attach to the private or neutral-host network.

12. The non-transitory computer-readable storage medium of claim 11, wherein the radio node comprises: an Evolved Node B (eNodeB), a Universal Mobile Telecommunications System (UMTS) NodeB and radio network controller (RNC), or a New Radio (NR) gNB or gNodeB.

13. The non-transitory computer-readable storage medium of claim 11, wherein the identifier of the radio node comprises an E-UTRAN cell global identifier (ECGI).

14. The non-transitory computer-readable storage medium of claim 11, wherein the identifier of the electronic device comprises an international mobile subscriber identity (IMSI) or a subscription permanent identifier (SUPI).

15. The non-transitory computer-readable storage medium of claim 11, wherein the identifier of the service provider comprises a public land mobile network (PLMN) identifier.

16. The non-transitory computer-readable storage medium of claim 11, wherein determining the first entity identifier comprises performing a lookup in a predefined list of identifiers of one or more radio nodes in the private or neutral-host network and the first entity identifier; and wherein determining the second entity identifier comprises performing a lookup in a predefined list of one or more identifiers of electronic devices and the second entity identifier.

17. A method for restricting access to a private or neutral-host network associated with an entity, comprising:

by a computer:

receiving an attachment request associated with a radio node in the private or neutral-host network, wherein the attachment request is sourced from an electronic device, and comprises an identifier of the radio node, an identifier of the electronic device and an identifier of a service provider;

determining a first entity identifier of the entity based at least in part on the identifier of the radio node, and a second entity identifier of the entity based at least in part on the identifier of the electronic device;

when the first entity identifier matches the second entity identifier, performing authentication of the electronic device;

when the first entity identifier is different from the second entity identifier, and when the identifier of the service provider matches a predefined identifier of the service provider that is stored in memory, performing the authentication of the electronic device; and otherwise, not allowing the electronic device to attach to the private or neutral-host network.

18. The method of claim 17, wherein the identifier of the radio node comprises an E-UTRAN cell global identifier (ECGI), and the identifier of the electronic device comprises an international mobile subscriber identity (IMSI) or a subscription permanent identifier (SUPI).

19. The method of claim 17, wherein the identifier of the service provider comprises a public land mobile network (PLMN) identifier.

20. The method of claim 17, wherein determining the first entity identifier comprises performing a lookup in a predefined list of identifiers of one or more radio nodes in the private or neutral-host network and the first entity identifier; and wherein determining the second entity identifier comprises performing a lookup in a predefined list of one or more identifiers of electronic devices and the second entity identifier.

* * * * *